US012663849B2

(12) United States Patent
Zhang et al.

(10) Patent No.: US 12,663,849 B2
(45) Date of Patent: Jun. 23, 2026

(54) DATA PROCESSOR CORE, DATA PROCESSOR, ELECTRONIC DEVICE, AND STORAGE MEDIUM, INVOLVING A WARM-UP STATE

(71) Applicant: KUNLUNXIN TECHNOLOGY (BEIJING) COMPANY LIMITED, Beijing (CN)

(72) Inventors: Hui Zhang, Beijing (CN); Jing Wang, Beijing (CN); Jian Ouyang, Beijing (CN); Huimin Li, Beijing (CN); Canghai Gu, Beijing (CN); Xinyi Zhang, Beijing (CN)

(73) Assignee: KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 213 days.

(21) Appl. No.: 18/636,503

(22) Filed: Apr. 16, 2024

(65) Prior Publication Data

US 2024/0393856 A1      Nov. 28, 2024

(30) Foreign Application Priority Data

May 22, 2023    (CN) .......................... 202310582913.8

(51) Int. Cl.
*G06F 1/32*          (2019.01)
*G06F 1/3206*       (2019.01)
*G06F 9/38*          (2018.01)

(52) U.S. Cl.
CPC .......... *G06F 1/3206* (2013.01); *G06F 9/3802* (2013.01)

(58) Field of Classification Search
None
See application file for complete search history.

(56) References Cited

U.S. PATENT DOCUMENTS

| 6,338,137 B1 * | 1/2002 | Shiell | .................. G06F 9/30072 |
| | | | 712/225 |
| 6,345,362 B1 * | 2/2002 | Bertin | .................. G06F 1/3287 |
| | | | 713/323 |

(Continued)

FOREIGN PATENT DOCUMENTS

| JP | 2013-229019 | 11/2013 |
| JP | 2014-059761 | 4/2014 |

OTHER PUBLICATIONS

Communication issued in corresponding European Patent Application No. 24174359.0, dated Jun. 26, 2025.

(Continued)

*Primary Examiner* — Danny Chan
(74) *Attorney, Agent, or Firm* — Pillsbury Winthrop Shaw Pittman, LLP

(57)          ABSTRACT

A data processor core, which relates to a field of artificial intelligence technology, and in particular to a field of integrated circuit technology and a field of chip technology. The processor core includes: a control unit configured to generate a warm-up instruction in response to detecting a computing instruction to be processed; and a computing unit array including at least one computing unit sub-array, wherein the computing unit sub-array is configured to: receive the warm-up instruction configured to instruct the computing unit sub-array to perform a read operation and a computing operation; enter a warm-up state according to the warm-up instruction; and switch from the warm-up state to a computing state in response to receiving a target instruction corresponding to the computing instruction to be processed. The present disclosure further provides a data processor, a method of processing data, an electronic device, and a storage medium.

20 Claims, 11 Drawing Sheets

900

(56)                    References Cited

U.S. PATENT DOCUMENTS

| 10,386,909 B1 | 8/2019 | Poplack et al. | |
|---|---|---|---|
| 2005/0149769 A1* | 7/2005 | O'Connor | G06F 1/3234 |
| | | | 713/300 |
| 2009/0319712 A1* | 12/2009 | Pudipeddi | G06F 1/3203 |
| | | | 710/261 |
| 2013/0013892 A1 | 1/2013 | Yamashita et al. | |
| 2014/0229720 A1* | 8/2014 | Hickey | G06F 1/3243 |
| | | | 712/240 |
| 2020/0192715 A1* | 6/2020 | Wang | G06F 12/0253 |

OTHER PUBLICATIONS

Office Action issued in corresponding Japanese Patent Application No. 2024-077371, dated May 27, 2025.
European Search Report issued in corresponding European Patent Application No. EP24174359.0, dated Oct. 21, 2024.

\* cited by examiner

20

P600

<u>700</u>

<u>8000</u>

900

DATA PROCESSOR CORE, DATA PROCESSOR, ELECTRONIC DEVICE, AND STORAGE MEDIUM, INVOLVING A WARM-UP STATE

This application claims priority to Chinese Patent Application No. 2023105829138 filed on May 22, 2023, which is incorporated herein in its entirety by reference.

TECHNICAL FIELD

The present disclosure relates to a field of artificial intelligence technology, and in particular to a field of integrated circuit technology and a field of chip technology. More specifically, the present disclosure provides a data processor core, a data processor, an apparatus of processing data, a method of processing data, an electronic device, and a storage medium.

BACKGROUND

With a development of artificial intelligence technology, application scenarios of artificial intelligence chips are constantly increasing. An artificial intelligence chip may have a large number of multiply-accumulate (MAC) arrays and strong capabilities of matrix computing.

SUMMARY

The present disclosure provides a data processor core, a data processor, an apparatus of processing data, a method of processing data, an electronic device, and a storage medium.

According to an aspect of the present disclosure, a data processor core is provided, including: a control unit configured to generate a warm-up instruction in response to detecting a computing instruction to be processed; and a computing unit array including at least one computing unit sub-array, wherein the computing unit sub-array is configured to: receive the warm-up instruction, wherein the warm-up instruction is configured to instruct the computing unit sub-array to perform a read operation and a computing operation; enter a warm-up state according to the warm-up instruction; and switch from the warm-up state to a computing state in response to receiving a target instruction corresponding to the computing instruction to be processed.

According to another aspect of the present disclosure, a data processor is provided, including at least one data processor core provided in the present disclosure.

According to another aspect of the present disclosure, an apparatus of processing data is provided, including the data processor provided in the present disclosure.

According to another aspect of the present disclosure, an electronic device is provided, including the apparatus of processing data provided in the present disclosure.

According to another aspect of the present disclosure, a method of processing data is provided, including: receiving a warm-up instruction, wherein the warm-up instruction is generated in response to detecting a computing instruction to be processed, and the warm-up instruction is configured to instruct the computing unit sub-array to perform a read operation and a computing operation; entering a warm-up state according to the warm-up instruction; and switching from the warm-up state to a computing state in response to receiving a target instruction corresponding to the computing instruction to be processed.

According to another aspect of the present disclosure, an electronic device is provided, including: at least one processor; and a memory communicatively connected to the at least one processor, where the memory stores instructions executable by the at least one processor, and the instructions, when executed by the at least one processor, cause the at least one processor to implement the method provided in the present disclosure.

According to another aspect of the present disclosure, a non-transitory computer-readable storage medium having computer instructions therein is provided, and the computer instructions are configured to cause a computer to implement the method provided in the present disclosure.

According to another aspect of the present disclosure, a computer program product containing a computer program is provided, and the computer program, when executed by a processor, causes the processor to implement the method provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

A computing power of an artificial intelligence chip may be positively correlated with the number of resources in a computing unit array. The higher computing power a chip has, the more computing resources are required. As a result, a chip with a high computing power has a high driving current and a high power consumption. In addition, a working frequency of the chip is high, which may exceed 1 GHz. The chip may reach a peak power consumption or a peak current in a short period of time. However, a response speed of the driving current of a power supply of the chip is relatively slow. This will be further illustrated in conjunction with FIG. 1.

Figure 1:
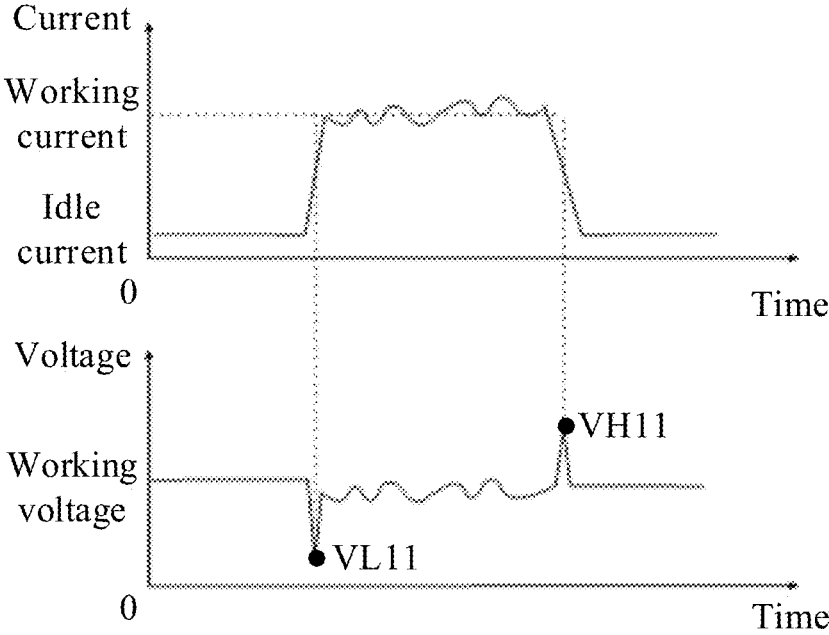
FIG. 1 shows a schematic diagram of a current and a voltage of an artificial intelligence chip according to an embodiment of the present disclosure.

FIG. 1 shows a schematic diagram of a current and a voltage of an artificial intelligence chip according to an embodiment of the present disclosure.

As shown in FIG. 1, in a case that the peak power consumption of the chip is determined, the computing power of the chip may approach or reach a peak computing power when the current quickly switches from an idle current to a working current, but a power supply voltage of the chip will have a sudden decrease (for example, to voltage VL11). When the current quickly switches from the working current to the idle current, the computing power of the chip is almost zero, but the power supply voltage of the chip will have a sudden increase (for example, to voltage VH11). The sudden increase or sudden decrease in the power supply voltage may have an adverse effect on the circuit of the chip. For example, if the power supply voltage has a sudden increase, it may cause the circuit to be broken down. If the power supply voltage has a sudden decrease, the circuit may not be able to obtain sufficient voltage, resulting in the circuit failing to work normally, and an incorrect computing result may be output.

In some embodiments, in order to avoid the sudden increase or sudden decrease in voltage, all computing units of the chip may be divided into blocks to obtain a plurality of computing unit arrays. The computing unit may be a multiply accumulate array. The computing unit array may be configured to compute in response to receiving a pulse signal. If no pulse signal is received, the computing unit array may be in an idle state, in which the computing unit array does not perform read operations, computing operations, or write operations. The power consumption of the computing unit array may be a standby power consumption. The standby power consumption may be a small value, lower than the peak power consumption. As a result, a block-based startup may be achieved, preventing the chip from reaching the peak computing power quickly. However, the block-based startup may affect the computing power of the chip. The reason is that the plurality of computing unit arrays of the chip are started in blocks. During the startup process, the plurality of computing unit arrays are sequentially started, which limits the computing power and leads to longer overall computing time and decreased performance of the chip.

In view of this, in order to improve the lifespan of the chip and maintain a high level of computing power for the chip, the present disclosure provides a data processor core, which will be further illustrated below.

Figure 2:
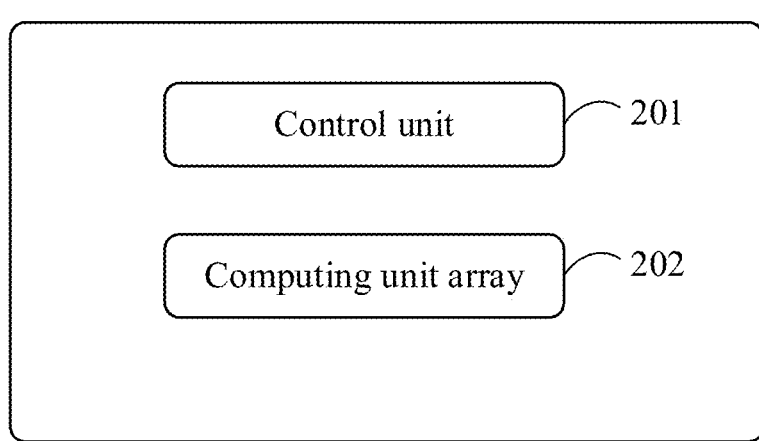
FIG. 2 shows a schematic block diagram of a data processor core according to an embodiment of the present disclosure.

FIG. 2 shows a schematic block diagram of a data processor core according to an embodiment of the present disclosure.

As shown in FIG. 2, the data processor core 20 may include a control unit 201 and a computing unit array 202.

The control unit 201 may be configured to generate a warm-up instruction in response to detecting a computing instruction to be processed. In the embodiments of the present disclosure, the computing instruction to be processed may be an instruction related to a deep learning model and related to matrix computations. For example, the control unit generates the warm-up instruction after receiving the computing instruction to be processed.

The computing unit array 202 may include at least one computing unit sub-array. The computing unit sub-array may be configured to receive the warm-up instruction, enter a warm-up state according to the warm-up instruction, and switch from the warm-up state to a computing state in response to receiving a target instruction corresponding to the computing instruction to be processed.

In the embodiments of the present disclosure, the computing unit array may be a multiply accumulate array, a multiply operation array, or a convolution array, among other computing unit arrays.

In the embodiments of the present disclosure, the warm-up instruction may instruct the computing unit sub-array to perform a read operation and a computing operation. For example, the warm-up instruction may instruct the computing unit sub-array to perform a read operation and a computing operation, or the warm-up instruction may instruct the computing unit sub-array not to perform write operations.

In the embodiments of the present disclosure, the target instruction may be determined according to the instruction to be processed. For example, the instruction to be processed may correspond to the processor core or the computing unit array. The target instruction may correspond to the computing unit sub-array. By splitting the matrix corresponding to the instruction to be processed, the sub-matrix corresponding to the target instruction may be determined.

According to the embodiments of the present disclosure, the computing unit sub-array enters the warm-up state based on the warm-up instruction, facilitating the entire computing core of the chip to reach or approach the peak power consumption gradually. Therefore, when processing the computing instruction, it is possible to reduce abrupt changes of power consumption on the chip and avoid the sudden increase of power consumption or the sudden decrease in voltage, facilitating to improve the performance and lifespan of the chip. In addition, before receiving the target instruction, the voltage of the chip is relatively stable. This may improve the accuracy of computing and maintain a high level of computing power, facilitating to improve the accuracy of the computing result.

It may be understood that the processor core of the present disclosure has been illustrated above, and the warm-up state and the computing state of the present disclosure will be further illustrated below.

In the embodiments of the present disclosure, the computing unit sub-array will be in the idle state if the computing instruction to be processed is not detected by the control unit. In the idle state, the computing unit sub-array does not perform read operations or computing operations.

In the embodiments of the present disclosure, if the computing instruction to be processed is detected by the control unit, the computing unit sub-array will receive the warm-up instruction generated by the control unit. The warm-up instruction may correspond to first data. This will be further illustrated below in conjunction with FIG. 3A.

Figure 3A:
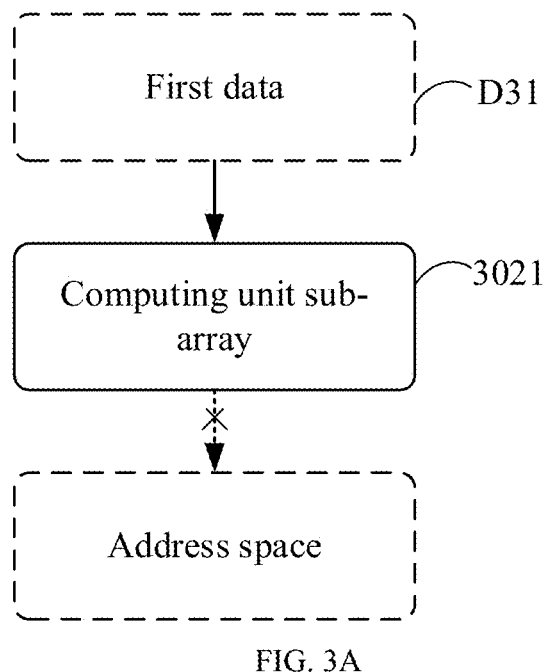
FIG. 3A shows a schematic diagram of a computing unit sub-array in a warm-up state according to an embodiment of the present disclosure.

FIG. 3A shows a schematic diagram of a computing unit sub-array in a warm-up state according to an embodiment of the present disclosure.

In the embodiments of the present disclosure, the computing unit sub-array may further be configured to read the first data to enter the warm-up state, and perform the computing operation according to the first data. As shown in FIG. 3A, the computing unit sub-array 3021 may read the first data. The computing unit sub-array 3021 may perform the computing operation according to the first data D31, to obtain a first computing result corresponding to the warm-up instruction. The first computing result may not be written into a register or an address space. During the read operation and the computing operation, the computing unit sub-array 3021 may be in the warm-up state. It may be understood that the state of the computing unit sub-array may include the idle state and the working state. In the embodiments of the present disclosure, the working state may include the warm-up state. The warm-up state may be a working state of performing the read operation and the computing operation according to the first data. According to the embodiments of the present disclosure, the read operation and the computing operation are performed according to the first data. This may gradually increase the power consumption of the chip and facilitate the implementation of the warm-up state.

It may be understood that the warm-up state of the present disclosure has been illustrated above, and the computing state of the present disclosure will be further illustrated below.

Figure 3B:
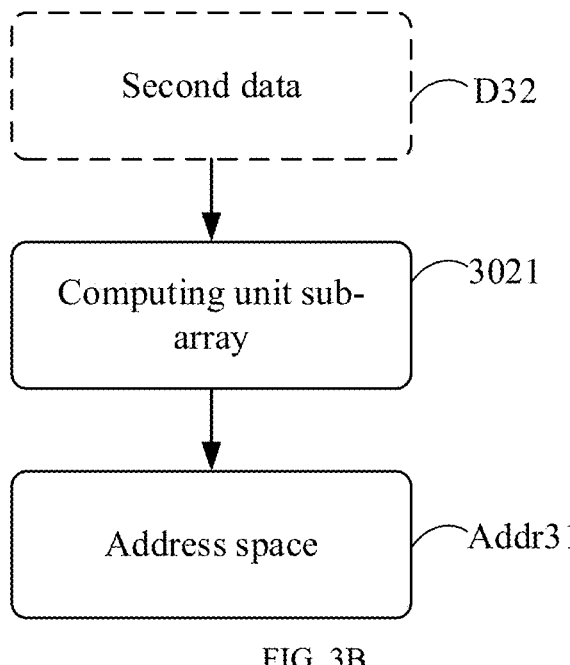
FIG. 3B shows a schematic diagram of a computing unit sub-array in a computing state according to an embodiment of the present disclosure.

FIG. 3B shows a schematic diagram of a computing unit sub-array in a computing state according to an embodiment of the present disclosure.

In the embodiments of the present disclosure, the target instruction corresponds to second data, and the target instruction is configured to instruct the computing unit sub-array to perform a read operation, a computing operation, and a write operation. For example, the second data may be a sub-matrix related to the computing instruction to be processed.

In the embodiments of the present disclosure, the computing unit sub-array may be configured to read the second data. As shown in FIG. 3B, the computing unit sub-array 3021 in the warm-up state may read the second data D32.

In the embodiments of the present disclosure, the computing unit sub-array may further be configured to overwrite a result obtained by performing the computing operation according to the first data, by second data corresponding to the target instruction. For example, the first computing result above may be overwritten by the second data D32. According to the embodiments of the present disclosure, the first computing result corresponding to the warm-up instruction is overwritten by the second data, so that the target instruction may be processed quickly, thereby the target instruction may be executed efficiently and the computing resources of the processor core may be saved.

In the embodiments of the present disclosure, the computing unit sub-array may further be configured to perform the computing operation according to the second data to obtain a target computing result. For example, the computing unit sub-array 3021 may perform the computing operation according to the second data D32 to obtain a second computing result corresponding to the target instruction, as the target computing result.

In the embodiments of the present disclosure, the computing unit sub-array may further be configured to write the target computing result into an address space corresponding to the target instruction, so as to switch from the warm-up state to the computing state. For example, the target instruction may correspond to the address space Addr31. The target computing result may be written into the address space Addr31. During the read operation, the computing operation, and write operation, the computing unit sub-array 3021 may be in the computing state. It may be understood that the states of the computing unit sub-array may include the idle state and the working state. In the embodiments of the present disclosure, it is also possible for the working state to include the computing state. The computing state may be a working state of performing the read operation, the computing operation, and the write operation according to the second data.

It may be understood that the computing unit sub-array in the warm-up state and the computing unit sub-array in the working state of the present disclosure have been illustrated above, and the first data and the second data of the present disclosure will be further illustrated below.

In the embodiments of the present disclosure, a data type of the first data may be consistent with a data type of the second data. For example, if the second data is floating-point data, the first data may be floating-point data too. For another example, if the second data is fixed-point data, the first data may be fixed-point data too.

In the embodiments of the present disclosure, a difference between a scale of the first data and a scale of the second data is less than or equal to a preset scale difference threshold. For example, if the scale of the second data is [n, c, h, w], the scale of the first data may also be [n, c, h, w], where n, c, h, and w may be positive integers. According to the embodiments of the present disclosure, the type of the first data may be the same as or similar to the type of the second data, and the scale of the first data may be the same as or similar to the scale of the second data, so that the computing unit sub-array may be quickly adapted to the data type of an actual computing instruction, further improving the computing power of the chip and improving the computing efficiency.

It may be understood that the first data and the second data of the present disclosure have been illustrated above, and the control unit and the computing unit sub-array of the present disclosure will be further illustrated below.

In the embodiments of the present disclosure, the computing unit array includes M computing unit groups, each computing unit group including at least one computing unit sub-array, where M is an integer greater than or equal to 1. This will be illustrated below with reference to FIG. 4A.

Figure 4A:
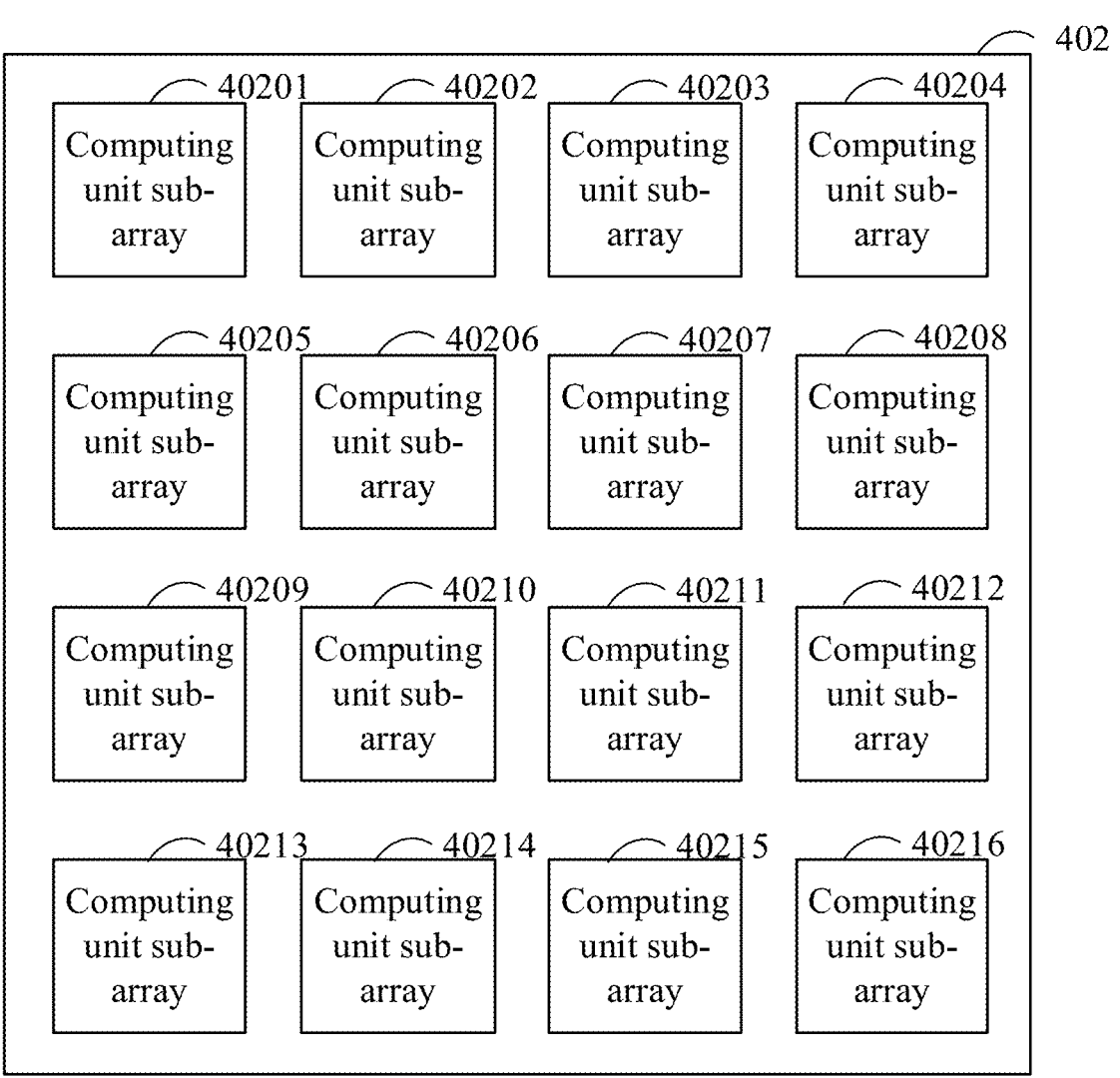
FIG. 4A shows a schematic diagram of a computing unit array according to an embodiment of the present disclosure.

FIG. 4A shows a schematic diagram of a computing unit array according to an embodiment of the present disclosure.

As shown in FIG. 4A, the computing unit array 402 may include a computing unit sub-array 40201, a computing unit sub-array 40202, a computing unit sub-array 40203, a computing unit sub-array 40204, a computing unit sub-array 40205, a computing unit sub-array 40206, a computing unit sub-array 40207, a computing unit sub-array 40208, a computing unit sub-array 40209, a computing unit sub-array 40210, a computing unit sub-array 40211, a computing unit sub-array 40212, a computing unit sub-array 40213, a computing unit sub-array 40214, a computing unit sub-array 40215, and a computing unit sub-array 40216. It may be understood that for the detailed description of the computing unit sub-arrays 40201 to 40216, reference may be made to the computing unit sub-array 3021 above, which will not be repeated here.

As shown in FIG. 4A, the computing unit array may include four computing unit groups. A first computing unit group may include the computing unit sub-array 40201 to the computing unit sub-array 40204. A second computing unit group may include the computing unit sub-array 40205 to the computing unit sub-array 40208. A third computing unit group may include the computing unit sub-array 40209 to the computing unit sub-array 40212. A fourth computing unit group may include the computing unit sub-array 40213 to the computing unit sub-array 40216. It may be understood that in this embodiment, M=4.

As shown in FIG. 4A, the computing unit sub-array 40201 to the computing unit sub-array 40216 may be in the idle state.

In the embodiments of the present disclosure, the control unit may be configured to generate warm-up instruction(s) in response to detecting the computing instruction to be processed. Next, the control unit may be configured to output the warm-up instruction(s) to at least one computing unit sub-array. This will be further illustrated in conjunction with FIG. 4B to FIG. 4E.

FIG. 4B to FIG. 4E show schematic diagrams of computing unit groups in the warm-up state according to an embodiment of the present disclosure.

Figure 4B:
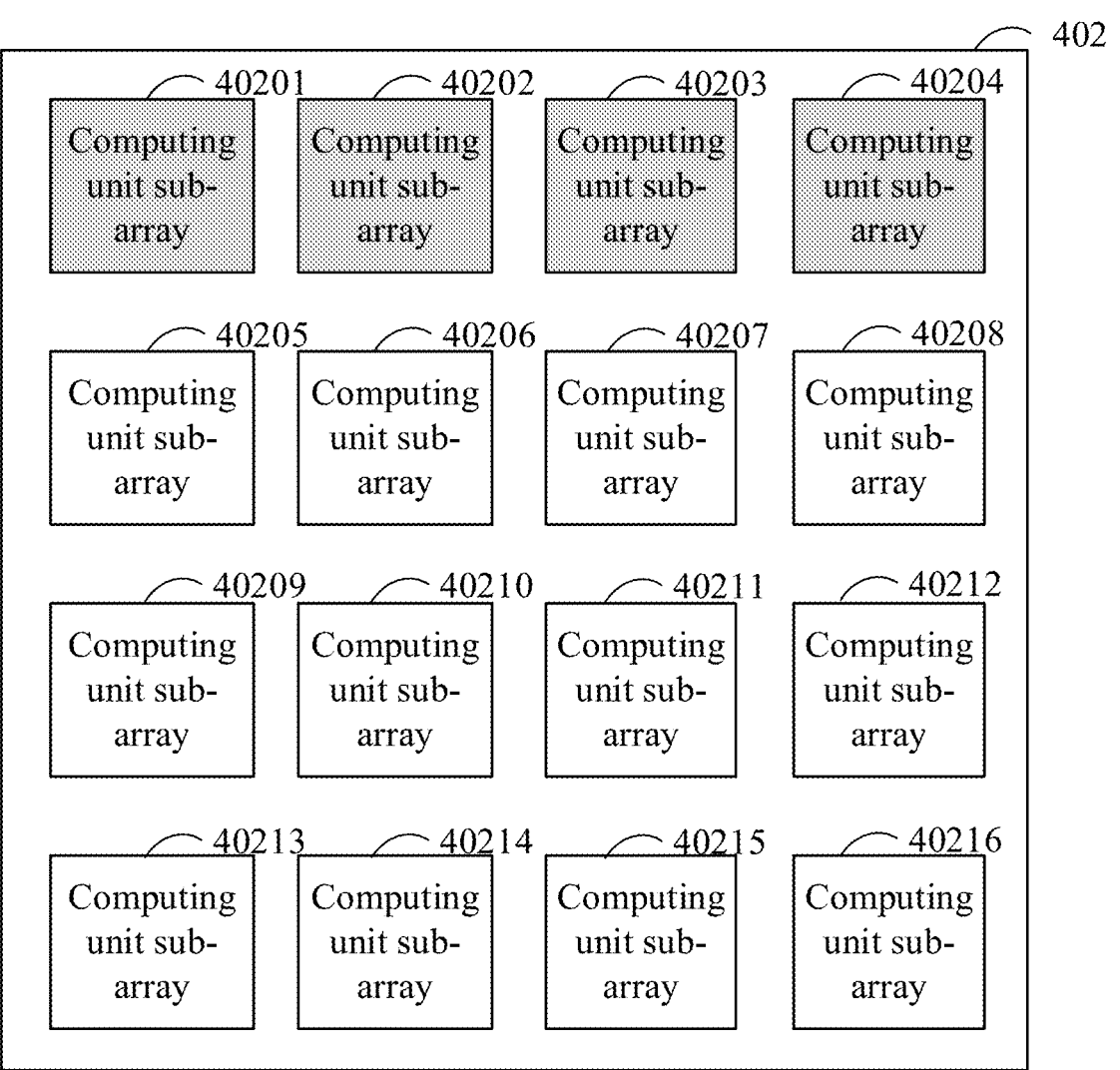
FIG. 4B to FIG. 4E show schematic diagrams of computing unit groups in the warm-up state according to an embodiment of the present disclosure.

In the embodiments of the present disclosure, the control unit may be configured to output warm-up instruction(s) to an m-th computing unit group of the M computing unit groups. For example, four warm-up instructions may be output to the four computing unit sub-arrays in the first computing unit group. Each of the computing unit sub-arrays 40201 to 40204 may receive respective warm-up instruction and enter the warm-up state according to the warm-up instructions. The computing unit sub-arrays 40201 to 40204 in the warm-up state are shown in FIG. 4B.

In the warm-up state, a sum of the first power consumptions for the computing unit sub-array 40201 to the computing unit sub-array 40204 may be, for example, 20% of the peak power consumption of the computing unit array 402.

Figure 4C:
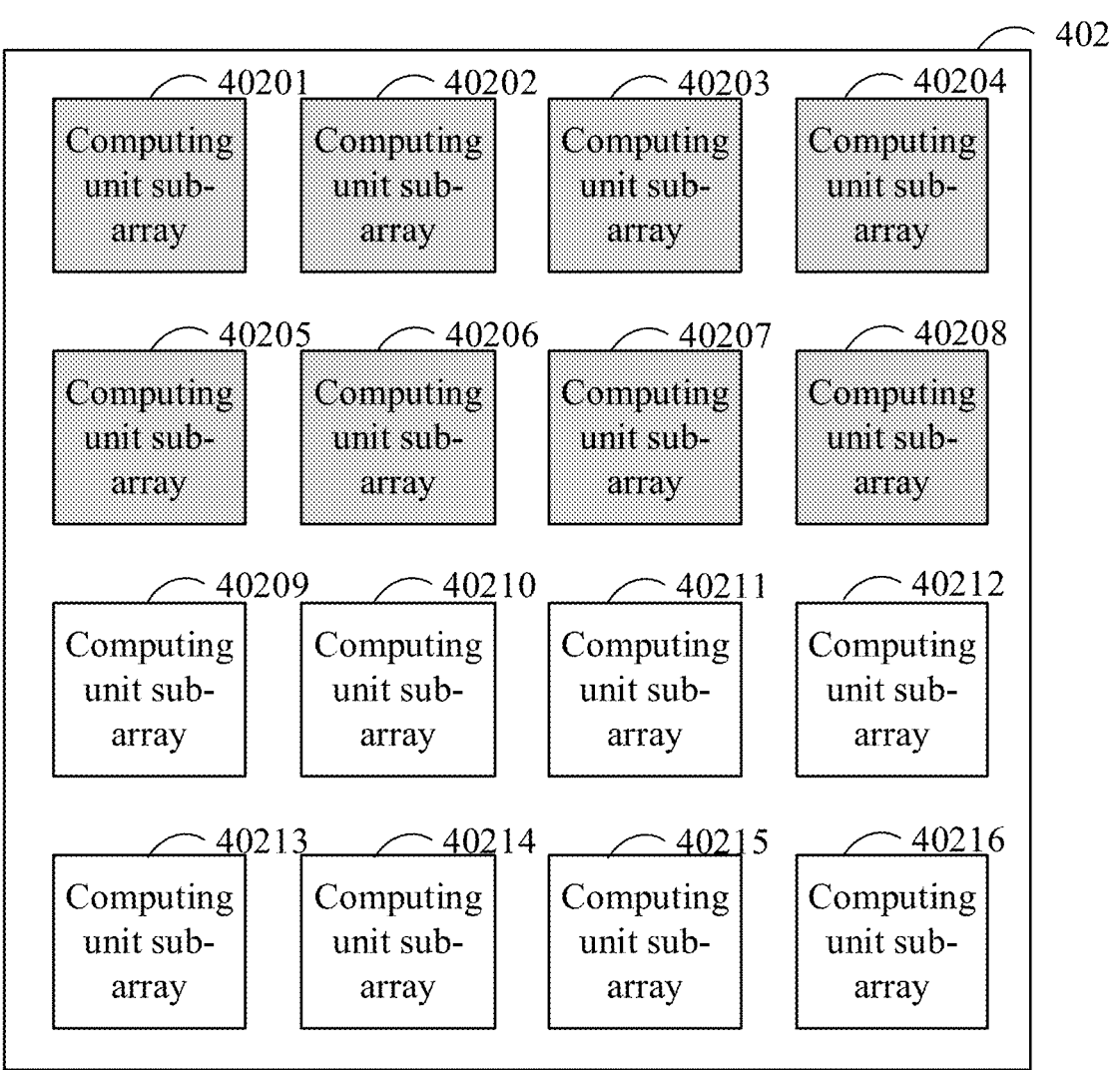

In the embodiments of the present disclosure, the control unit may further be configured to output warm-up instruction(s) to an (m+1)-th computing unit group of the M computing unit groups, in response to determining that N computing unit sub-arrays in the m-th computing unit group have entered the warm-up state, where m may be an integer greater than or equal to 1 and less than M. For example, after determining that the four computing unit sub-arrays in the first computing unit group have entered the warm-up state, warm-up instructions may be output to the four computing unit sub-arrays in the second computing unit group. Each of the computing unit sub-arrays 40205 to 40208 receives respective warm-up instruction and enters the warm-up state according to the warm-up instruction. The computing unit sub-arrays 40205 to 40208 in the warm-up state are shown in FIG. 4C. According to the embodiments of the present disclosure, the warm-up instruction may be sequentially provided to different computing unit sub-arrays, so that the power consumption is gradually increased, avoiding abrupt changes of power consumption and low voltage.

In the warm-up state, the sum of the first power consumptions for the computing unit sub-array 40201 to the computing unit sub-array 40208 may be, for example, 40% of the peak power consumption of the computing unit array 402.

Figure 4D:
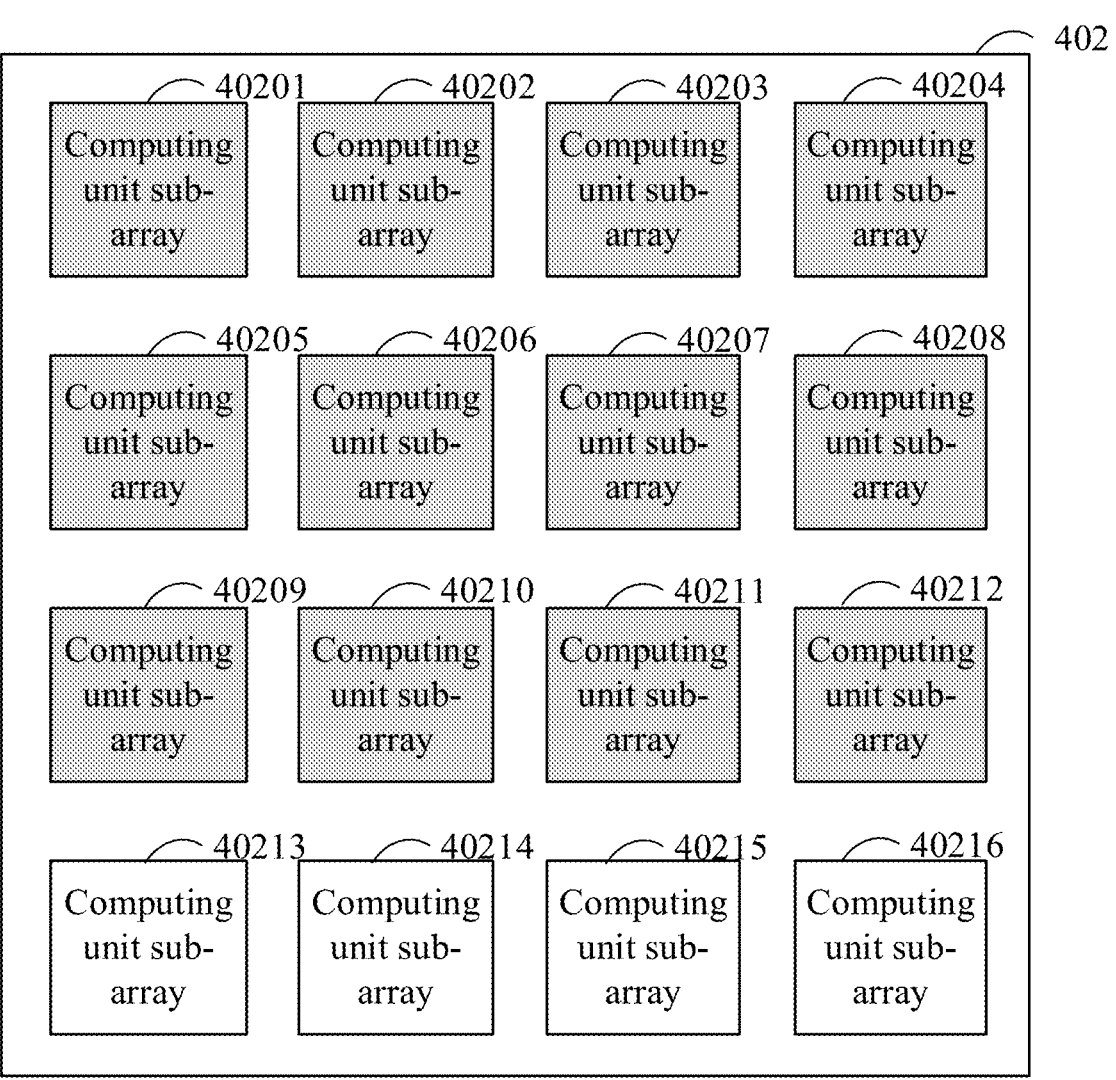

Next, after determining that the four computing unit sub-arrays in the second computing unit group have entered the warm-up state, the control unit may output warm-up instructions to the four computing unit sub-arrays in the third computing unit group. Each of the computing unit sub-arrays 40209 to 40212 receives respective warm-up instruction and enters the warm-up state according to the warm-up instruction. The computing unit sub-arrays 40209 to 40212 in the warm-up state are shown in FIG. 4D.

In the warm-up state, the sum of the first power consumptions for the computing unit sub-array 40201 to the computing unit sub-array 40212 may be, for example, 60% of the peak power consumption of the computing unit array 402.

Figure 4E:
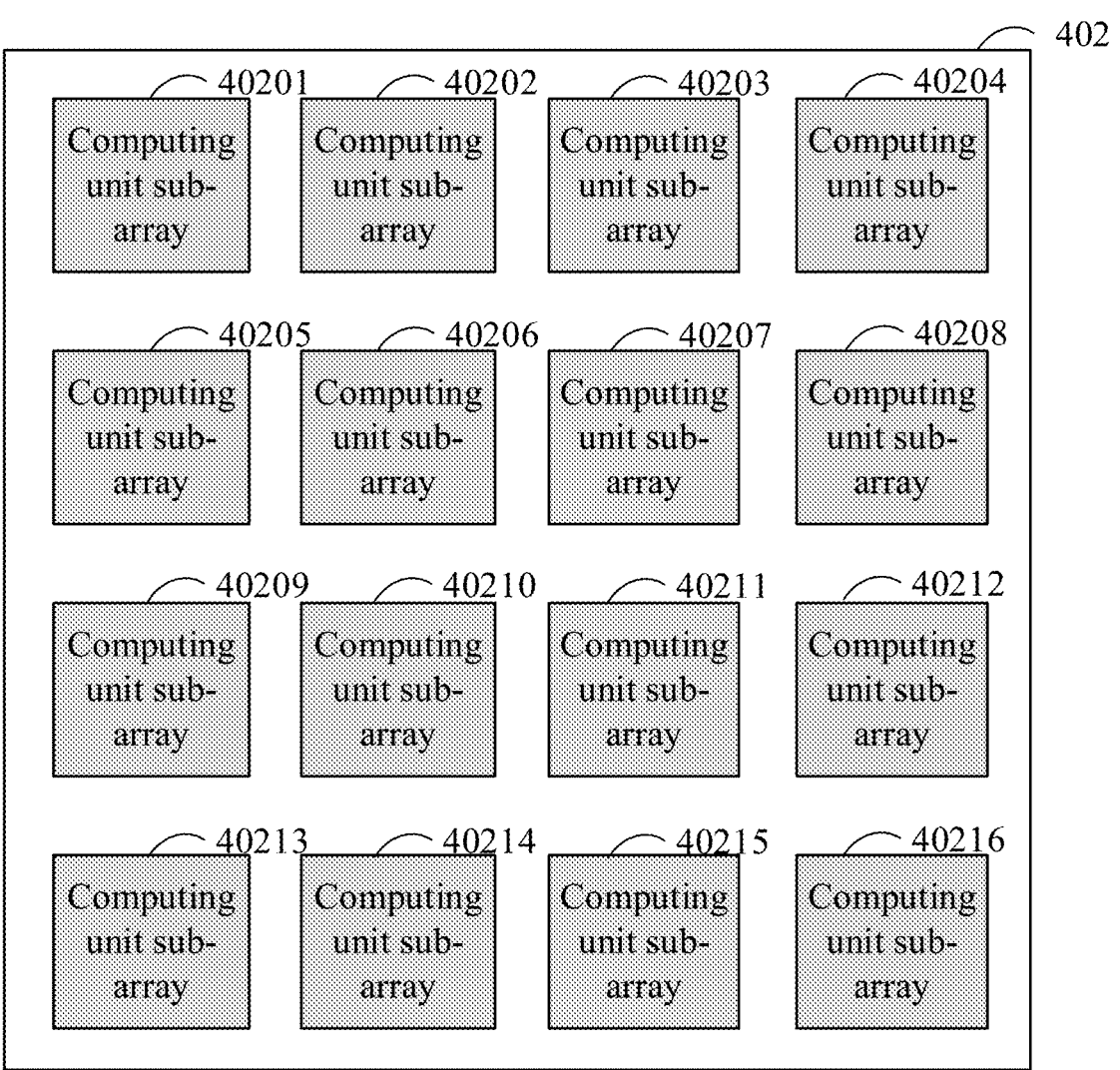

Next, after determining that the four computing unit sub-arrays in the third computing unit group have entered the warm-up state, the control unit may output warm-up instructions to the four computing unit sub-arrays in the fourth computing unit group. Each of the computing unit sub-arrays 40213 to 40216 receives respective warm-up instruction and enters the warm-up state according to the warm-up instruction. The computing unit sub-arrays 40213 to 40216 in the warm-up state are shown in FIG. 4E.

In the warm-up state, the sum of the first power consumptions for the computing unit sub-array 40201 to the computing unit sub-array 40216 may be, for example, 80% of the peak power consumption of the computing unit array 402. It may be understood that the sum of the first power consumptions is only an example. In other embodiments, in the warm-up state, the sum of the first power consumptions for the computing unit sub-array 40201 to the computing unit sub-array 40216 may be consistent with the peak power consumption of the computing unit array 402, for example.

It may be understood that the plurality of computing unit sub-arrays entering the warm-up state have been illustrated above, and some implementations of switching to the computing state will be illustrated below.

Figure 4F:
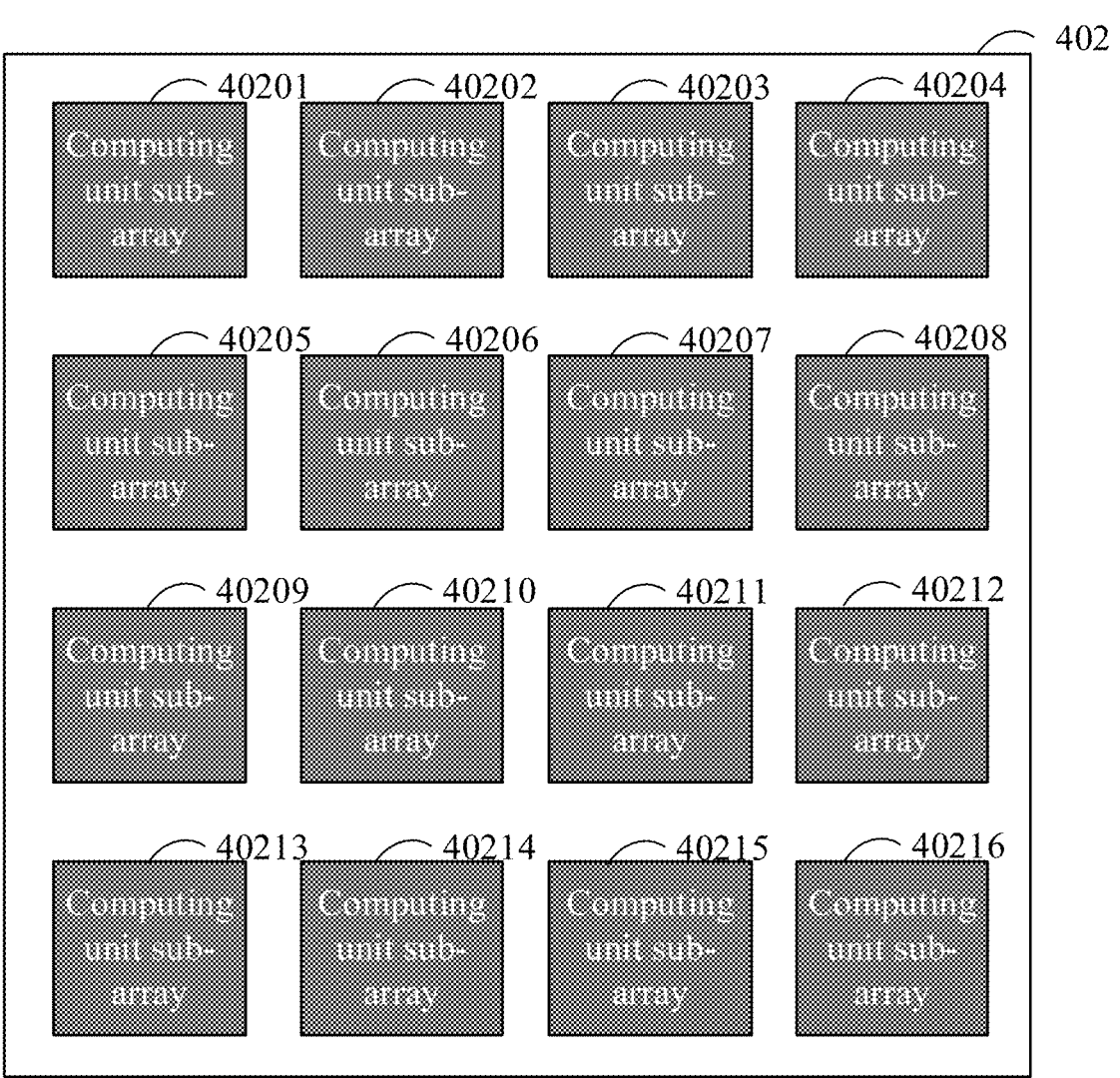
FIG. 4F shows a schematic diagram of a computing unit array in the computing state according to an embodiment of the present disclosure.

FIG. 4F shows a schematic diagram of a computing unit array in the computing state according to an embodiment of the present disclosure.

In the embodiments of the present disclosure, the control unit may further be configured to output target instruction(s) to at least one target computing unit sub-array among computing unit sub-arrays in the warm-up state, in response to determining that a number of the computing unit sub-arrays in the warm-up state is greater than or equal to a preset number threshold. For example, the preset number threshold may be related to the number of computing unit sub-arrays in the computing unit array. As shown in FIG. 4E, the computing unit array 402 includes 16 computing unit sub-arrays. The preset number threshold may be, for example, 12 or 16. Taking the preset number threshold of 16 as an example, after the computing unit sub-array 40201 to the computing unit sub-array 40216 have entered the warm-up state, the control unit may output target instructions to the computing unit sub-arrays 40201 to 40216 respectively, so that each of the computing unit sub-arrays 40201 to 40216 reads the second data according to its respective target instruction, and then perform computing operation and write operation, to enter the computing state. The computing unit sub-arrays 40201 to 40216 in the computing state are shown in FIG. 4F.

In the embodiments of the present disclosure, a difference between a first power consumption corresponding to the warm-up state and a second power consumption corresponding to the computing state is less than or equal to a preset power consumption difference threshold. For example, in the computing state, the sum of the second power consumptions for the computing unit sub-arrays 40201 to 40216 may be, for example, 100% of the peak power consumption of the computing unit array 402. For example, the preset power consumption difference threshold may be 25%, and the difference (20%) between the sum of the second power consumptions and the sum of the first power consumptions is less than the preset power consumption difference threshold (25%).

It may be understood that the control unit 201 and the computing unit array 202 are used as examples above to illustrate the present disclosure. But the present disclosure is not limited to this. There may be at least one control unit and at least one computing unit array. Further illustration will be provided below.

In the embodiments of the present disclosure, the data processor core includes a plurality of control units and a plurality of computing unit arrays, with each control unit corresponding to one of the plurality of computing unit arrays. For example, the plurality of control units may include a first control unit and a second control unit. The plurality of computing unit arrays may include a first computing unit array and a second computing unit array. The first control unit may correspond to the first computing unit array and a warm-up instruction may be generated for the first computing unit array. The second control unit may correspond to the second computing unit array and a warm-up instruction may be generated for the second computing unit array.

In other embodiments of the present disclosure, it is also possible that one control unit corresponds to a plurality of computing unit arrays, or a plurality of control units correspond to one computing unit array. This present disclosure is not limited to this.

It may be understood that the control unit and the computing unit array of the present disclosure have been illustrated above, and the control unit of the present disclosure will be further illustrated below.

In the embodiments of the present disclosure, the control unit may further be configured to output warm-up instruction(s) to at least one target computing unit sub-array among the computing unit sub-arrays in the computing state in response to determining that the target instruction has been executed. For example, the warm-up instruction may be output to the computing unit sub-array 40201 to the computing unit sub-array 40216 mentioned above, so that the computing unit sub-array 40201 to the computing unit sub-array 40216 may switch from the computing state to the warm-up state, respectively.

In the embodiments of the present disclosure, the control unit may further be configured to output preset instruction(s) to an m-th computing unit group of the M computing unit groups. For example, four preset instructions may be output to the four computing unit sub-arrays in the first computing unit group respectively. Each of the computing unit sub-arrays 40201 to 40204 may receive respective preset instruction and switch from the warm-up state to the idle state according to the preset instruction.

In the embodiments of the present disclosure, the control unit may further be configured to output preset instruction(s) to an (m+1)-th computing unit group of the M computing unit groups, in response to determining that N computing unit sub-arrays in the m-th computing unit group have entered the idle state. For example, after determining that the four computing unit sub-arrays in the first computing unit group have entered the idle state, preset instructions may be output to the four computing unit sub-arrays in the second computing unit group. Each of the computing unit sub-arrays 40205 to 40208 receives respective preset instruction and switch to the idle state according to the preset instruction.

Next, after determining that the four computing unit sub-arrays in the second computing unit group have switched to the idle state, the control unit may output preset instructions to the four computing unit sub-arrays in the third computing unit group. Each of the computing unit sub-arrays 40209 to 40212 receives respective preset instruction and switch to the idle state according to the preset instruction.

Next, after determining that the four computing unit sub-arrays in the third computing unit group have switched to the idle state, the control unit may output preset instructions to the four computing unit sub-arrays in the fourth computing unit group. Each of the computing unit sub-arrays 40213 to 40216 receives respective preset instruction and switch to the idle state according to the preset instruction. According to the embodiments of the present disclosure, it is possible to control the computing unit array to gradually decrease from a predetermined power consumption value to the standby power consumption. As a result, after the computing is completed, the abrupt changes of the power consumption of the chip may be further reduced, the sudden decrease in power consumption or the sudden increase in voltage may be avoided, which helps to further improve the performance and lifespan of the chip.

It may be understood that the warm-up instruction of the present disclosure has been further illustrated above, and a current and a voltage of a chip including the data processor core of the present disclosure will be illustrated below.

Figure 5:
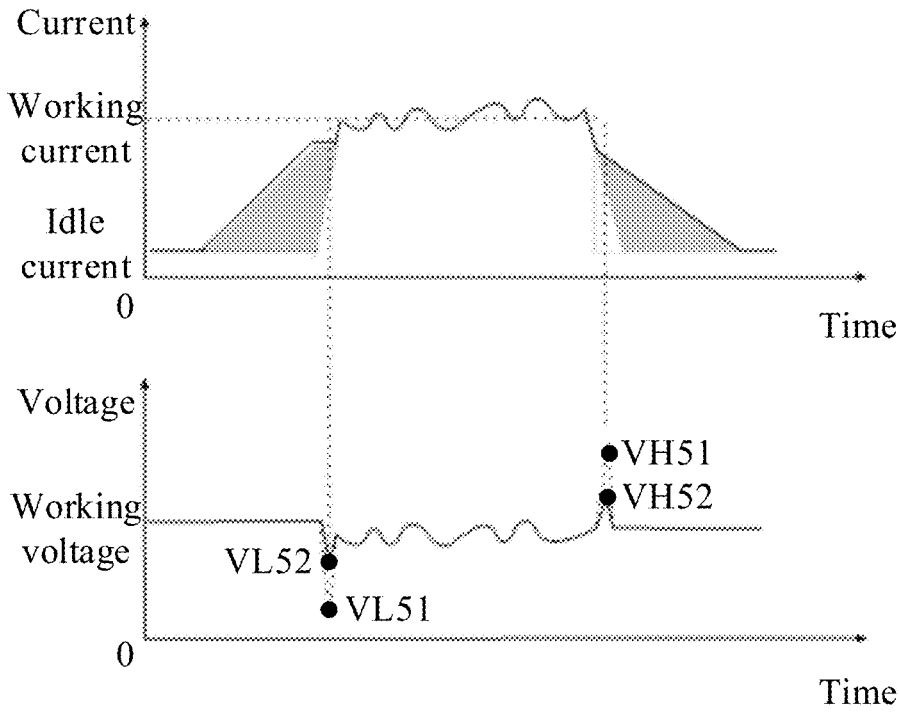
FIG. 5 shows a schematic diagram of a current and a voltage of a chip including a data processor core according to an embodiment of the present disclosure.

FIG. 5 shows a schematic diagram of a current and a voltage of a chip including a data processor core according to an embodiment of the present disclosure.

As described above, in a case that the peak power consumption of the chip is determined, the computing power of the chip may approach or reach the peak computing power when the current quickly switches from the idle current to the working current, but the power supply voltage of the chip will have a sudden decrease to voltage VL51.

As shown in FIG. 5, for example, in a case that the peak power consumption of the chip including the processor core 20 is determined, the current of the chip gradually switches from the idle current to the working current based on the warm-up instruction. When the computing power of the chip may approach or reach the peak computing power, the power supply voltage of the chip will also have a sudden decrease, to voltage VL52.

As shown in FIG. 5, the voltage VL52 is greater than the voltage VL51. Therefore, when the current of the chip gradually switches from the idle current to the working current based on the warm-up instruction, the voltage fluctuation amplitude of the chip is significantly reduced, facilitating to improve the performance and lifespan of the chip.

In addition, as described above, when the current quickly switches from the working current to the idle current, the computing power of the chip is almost zero, but the power supply voltage of the chip will have a sudden increase to voltage VH51.

As shown in FIG. 5, in the case that the peak power consumption of the chip including the processor core 20 is determined, the current of the chip gradually switches from the working current to the idle current based on the warm-up instruction. When the computing power of the chip is almost zero, the power supply voltage of the chip will also have a sudden increase, to voltage VH52.

As shown in FIG. 5, the voltage VH52 is less than the voltage VH51. Therefore, when the current of the chip gradually switches from the working current to the idle current based on the warm-up instruction and the preset instruction, the voltage fluctuation amplitude of the chip is significantly reduced, facilitating to improve the performance and lifespan of the chip.

It may be understood that the data processor core of the present disclosure has been illustrated above, and a data processor including the data processor core will be illustrated below.

Figure 6:
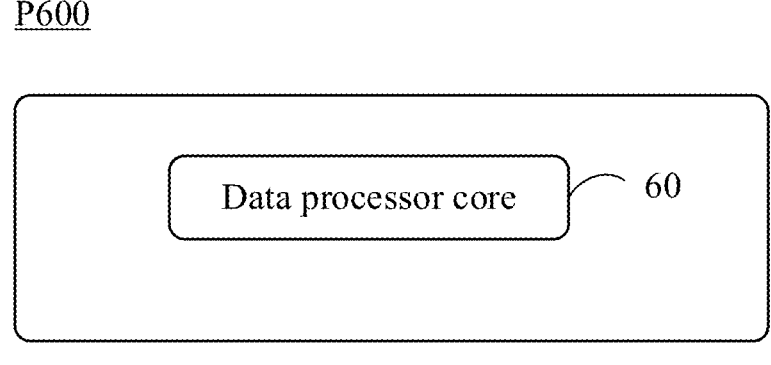
FIG. 6 shows a schematic diagram of a data processor according to an embodiment of the present disclosure.

FIG. 6 shows a schematic diagram of a data processor according to an embodiment of the present disclosure.

As shown in FIG. 6, the data processor P600 may include at least one data processor core 60. The data processor core 60 may be, for example, the data processor core 20 above.

It may be understood that the data processor of the present disclosure has been illustrated above, and an apparatus of processing data which includes the data processor will be illustrated below.

Figure 7:
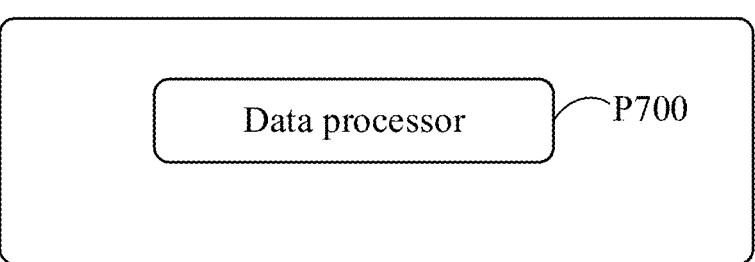
FIG. 7 shows a schematic diagram of an apparatus of processing data according to an embodiment of the present disclosure.

FIG. 7 shows a schematic diagram of an apparatus of processing data according to an embodiment of the present disclosure.

As shown in FIG. 7, the apparatus 700 of processing data may include a data processor P700. The data processor P700 may be, for example, the data processor P600 above.

It may be understood that the apparatus of processing data of the present disclosure has been illustrated above, and an electronic device including the apparatus of processing data will be illustrated below.

Figure 8:
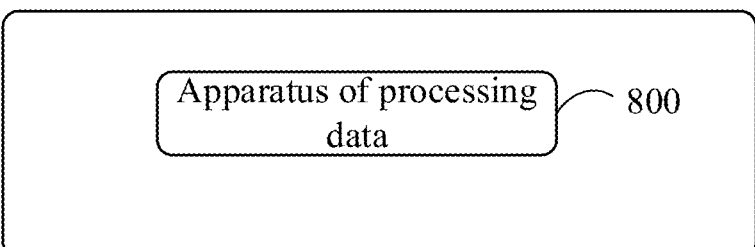
FIG. 8 shows a schematic diagram of an electronic device according to an embodiment of the present disclosure.

FIG. 8 shows a schematic diagram of an electronic device according to an embodiment of the present disclosure.

As shown in FIG. 8, the electronic device 8000 may include an apparatus 800 of processing data. The apparatus 800 of processing data may be, for example, the apparatus 700 of processing data above.

It may be understood that the electronic device of the present disclosure has been illustrated above, and a method of processing data will be illustrated below.

Figure 9:
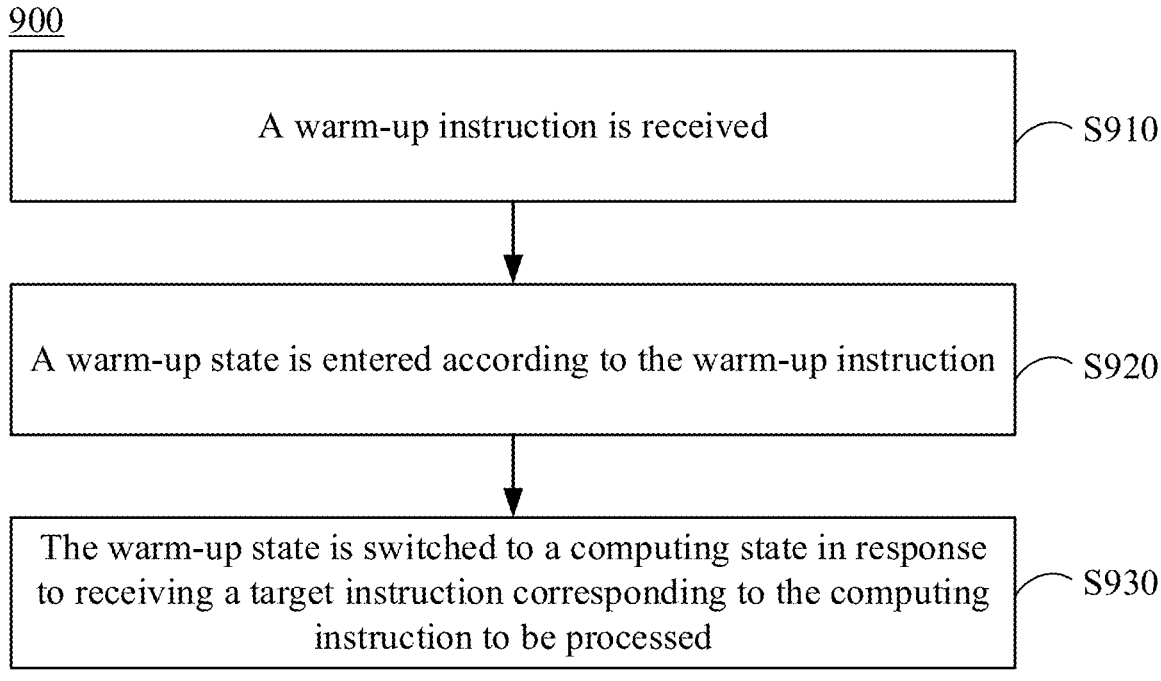
FIG. 9 shows a schematic flowchart of a method of processing data according to an embodiment of the present disclosure.

FIG. 9 shows a schematic flowchart of a method of processing data according to an embodiment of the present disclosure.

As shown in FIG. 9, the method 900 may include operations S910 to S930.

In operation S910, a warm-up instruction is received. In the embodiments of the present disclosure, the warm-up instruction is generated in response to detecting a computing instruction to be processed.

In operation S920, a warm-up state is entered according to the warm-up instruction.

In operation S930, the warm-up state is switched to a computing state in response to receiving a target instruction corresponding to the computing instruction to be processed.

In the embodiments of the present disclosure, the method 900 may be implemented by the computing unit sub-array mentioned above.

In the embodiments of the present disclosure, the warm-up instruction is configured to instruct the computing unit sub-array to perform a read operation and a computing operation. For example, the warm-up instruction may be generated by the control unit mentioned above.

In some embodiments, the warm-up instruction corresponds to first data.

In some embodiments, entering the warm-up state according to the warm-up instruction includes: reading the first data to enter the warm-up state; and performing the computing operation according to the first data.

In some embodiments, the target instruction corresponds to second data, and the target instruction is configured to instruct the computing unit sub-array to perform a read operation, a computing operation, and a write operation.

In some embodiments, switching from the warm-up state to the computing state includes: reading the second data to switch from the warm-up state to the computing state; performing the computing operation according to the second data to obtain a target computing result; and writing the target computing result into an address space corresponding to the target instruction.

In some embodiments, the method 900 further includes: overwriting a result obtained by performing the computing operation according to the first data, by second data corresponding to the target instruction.

In some embodiments, the target instruction is output to at least one target computing unit sub-array among computing unit sub-arrays in the warm-up state, in response to determining that a number of the computing unit sub-arrays in the warm-up state is greater than or equal to a preset number threshold.

In some embodiments, the computing unit array includes M computing unit groups, each computing unit group including at least one computing unit sub-array, where M is an integer greater than or equal to 1.

In some embodiments, the method 900 further includes: outputting the warm-up instruction to an m-th computing unit group of the M computing unit groups; and outputting the warm-up instruction to an (m+1)-th computing unit group of the M computing unit groups, in response to determining that N computing unit sub-arrays in the m-th computing unit group have entered the warm-up state, where m is an integer greater than or equal to 1 and less than M.

In some embodiments, a difference between a first power consumption corresponding to the warm-up state and a second power consumption corresponding to the computing state is less than or equal to a preset power consumption difference threshold.

In some embodiments, the warm-up instruction corresponds to first data, and the target instruction corresponds to second data; and a difference between a scale of the first data and a scale of the second data is less than or equal to a preset scale difference threshold.

In technical solutions of the present disclosure, a collection, a storage, a use, a processing, a transmission, a provision, a disclosure and other processing of user personal information involved comply with provisions of relevant laws and regulations and do not violate public order and good custom.

According to embodiments of the present disclosure, the present disclosure further provides an electronic device, a readable storage medium, and a computer program product.

Figure 10:
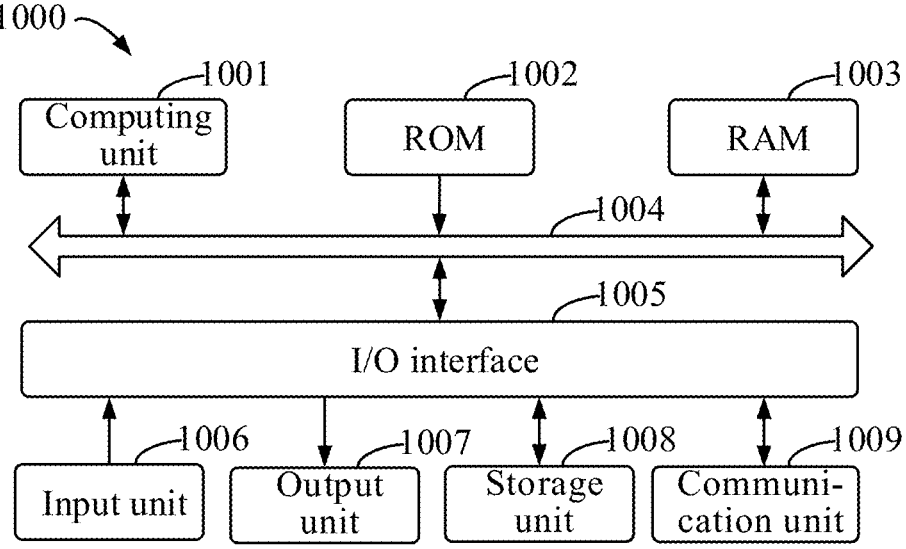
FIG. 10 shows a block diagram of an electronic device to which a method of processing data may be applied according to an embodiment of the present disclosure.

FIG. 10 shows a schematic block diagram of an example electronic device 1000 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing units 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processes described above, such as the method of processing data. For example, in some embodiments, the method of processing data may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the method of processing data described above. Alternatively, in other embodiments, the computing unit 1001 may be used to perform the method of processing data by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) display or LCD (liquid crystal display)) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A data processor core, comprising:
   a control unit configured to generate a warm-up instruction in response to detection of a computing instruction to be processed; and
   a computing unit array comprising at least one computing unit sub-array, wherein the computing unit sub-array is configured to:

receive the warm-up instruction, wherein the warm-up instruction is configured to instruct the computing unit sub-array to perform a read operation and a computing operation;

enter a warm-up state according to the warm-up instruction; and switch from the warm-up state to a computing state in response to receipt of a target instruction corresponding to the computing instruction to be processed, wherein a difference between a first power consumption corresponding to the warm-up state and a second power consumption corresponding to the computing state is less than or equal to a preset power consumption difference threshold.

2. The processor core according to claim 1, wherein the warm-up instruction corresponds to first data.

3. The processor core according to claim 2, wherein the computing unit sub-array is further configured to:

read the first data to enter the warm-up state; and perform the computing operation according to the first data.

4. The processor core according to claim 1, wherein the target instruction corresponds to second data, and the target instruction is configured to instruct the computing unit sub-array to perform a read operation, a computing operation, and a write operation.

5. The processor core according to claim 4, wherein the computing unit sub-array is further configured to:

read the second data to switch from the warm-up state to the computing state;

perform the computing operation according to the second data to obtain a target computing result; and write the target computing result into an address space corresponding to the target instruction.

6. The processor core according to claim 2, wherein the computing unit sub-array is further configured to overwrite a result obtained by performing the computing operation according to the first data, by second data corresponding to the target instruction.

7. The processor core according to claim 1, wherein the control unit is further configured to output the target instruction to at least one target computing unit sub-array among computing unit sub-arrays in the warm-up state, in response to a determination that a number of the computing unit sub-arrays in the warm-up state is greater than or equal to a preset number threshold.

8. The processor core according to claim 1, wherein the computing unit array comprises M computing unit groups, each computing unit group comprising at least one computing unit sub-array, wherein M is an integer greater than or equal to 1, and the control unit is further configured to:

output the warm-up instruction to an m-th computing unit group of the M computing unit groups; and output the warm-up instruction to an (m+1)-th computing unit group of the M computing unit groups, in response to a determination that N computing unit sub-arrays in the m-th computing unit group have entered the warm-up state, wherein m is an integer greater than or equal to 1 and less than M.

9. The processor core according to claim 1, wherein the warm-up instruction corresponds to first data, and the target instruction corresponds to second data;

a data type of the first data is consistent with a data type of the second data; and a difference between a scale of the first data and a scale of the second data is less than or equal to a preset scale difference threshold.

10. The processor core according to claim 1, wherein the data processor core comprises a plurality of control units and a plurality of computing unit arrays, with each control unit corresponding to one of the plurality of computing unit arrays.

11. A data processor, comprising at least one data processor core as claimed in claim 1.

12. An apparatus of processing data, comprising the data processor of claim 11.

13. An electronic device, comprising the apparatus of processing data of claim 12.

14. A method of processing data, the method comprising:

receiving a warm-up instruction, wherein the warm-up instruction is generated in response to detecting a computing instruction to be processed, and the warm-up instruction is configured to instruct the computing unit sub-array to perform a read operation and a computing operation;

entering a warm-up state according to the warm-up instruction; and switching from the warm-up state to a computing state in response to receiving a target instruction corresponding to the computing instruction to be processed, wherein a difference between a first power consumption corresponding to the warm-up state and a second power consumption corresponding to the computing state is less than or equal to a preset power consumption difference threshold.

15. The method according to claim 14, wherein the warm-up instruction corresponds to first data;

wherein entering the warm-up state according to the warm-up instruction comprises:

reading the first data to enter the warm-up state; and performing the computing operation according to the first data;

wherein the target instruction corresponds to second data, and the target instruction is configured to instruct the computing unit sub-array to perform a read operation, a computing operation, and a write operation;

wherein switching from the warm-up state to the computing state comprises:

reading the second data to switch from the warm-up state to the computing state;

performing the computing operation according to the second data to obtain a target computing result; and writing the target computing result into an address space corresponding to the target instruction;

wherein the method further comprises overwriting a result obtained by performing the computing operation according to the first data, by second data corresponding to the target instruction.

16. The method according to claim 14, wherein the target instruction is output to at least one target computing unit sub-array among computing unit sub-arrays in the warm-up state, in response to determining that a number of the computing unit sub-arrays in the warm-up state is greater than or equal to a preset number threshold;

wherein the computing unit array comprises M computing unit groups, each computing unit group comprising at least one computing unit sub-array, wherein M is an integer greater than or equal to 1; and wherein the method further comprises:

outputting the warm-up instruction to an m-th computing unit group of the M computing unit groups; and outputting the warm-up instruction to an (m+1)-th computing unit group of the M computing unit groups, in response to determining that N computing unit sub-arrays in the m-th computing unit group have entered the warm-up state, wherein m is an integer greater than or equal to 1 and less than M.

17. The method according to claim 14, wherein the warm-up instruction corresponds to first data, the target instruction corresponds to second data, a data type of the first data is consistent with a data type of the second data, and a difference between a scale of the first data and a scale of the second data is less than or equal to a preset scale difference threshold.

18. An electronic device, comprising:

at least one processor; and a memory communicatively connected to the at least one processor, wherein the memory stores instructions executable by the at least one processor, and the instructions, when executed by the at least one processor, cause the at least one processor to implement at least the method of claim 14.

19. A non-transitory computer-readable storage medium having computer instructions therein, wherein the computer instructions are configured to cause a computer system to at least:

receive a warm-up instruction, wherein the warm-up instruction is generated in response to detecting a computing instruction to be processed, and the warm-up instruction is configured to instruct the computing unit sub-array to perform a read operation and a computing operation;

enter a warm-up state according to the warm-up instruction; and switch from the warm-up state to a computing state in response to receiving a target instruction corresponding to the computing instruction to be processed, wherein a difference between a first power consumption corresponding to the warm-up state and a second power consumption corresponding to the computing state is less than or equal to a preset power consumption difference threshold.

20. The non-transitory computer-readable storage medium according to claim 19, wherein the instructions are further configured to cause the computer system to output the target instruction to at least one target computing unit sub-array among computing unit sub-arrays in the warm-up state, in response to a determination that a number of the computing unit sub-arrays in the warm-up state is greater than or equal to a preset number threshold.

* * * * *